United States Patent [19]

Golden

[11] Patent Number: 5,597,211

[45] Date of Patent: Jan. 28, 1997

[54] BIDIRECTIONAL SIDE DUMP TRAILER

[76] Inventor: Randy Golden, 15 S. 14th St., Council Bluffs, Iowa 51501

[21] Appl. No.: 688,506

[22] Filed: Jul. 30, 1996

[51] Int. Cl.[6] ..................................................... B60P 1/16
[52] U.S. Cl. .......................... 298/17.6; 296/184; 298/18; 414/470
[58] Field of Search .................................... 105/263, 269; 296/184; 298/17.5, 17.6, 18; 414/470

[56] References Cited

U.S. PATENT DOCUMENTS

| | | | |
|---|---|---|---|
| 4,200,334 | 4/1980 | Lindholm | 298/18 X |
| 4,242,031 | 12/1980 | McMullen | 298/18 X |
| 4,494,798 | 1/1985 | Bailey | 298/18 X |
| 5,480,214 | 1/1996 | Rogers | 298/18 X |

FOREIGN PATENT DOCUMENTS 644158  10/1928  France ................................. 298/17.6

*Primary Examiner*—Karen B. Merritt
*Assistant Examiner*—Janice L. Krizek
*Attorney, Agent, or Firm*—Aupperle & Jacobs

[57] ABSTRACT

The present invention is directed to a bidirectional side dump trailer which includes a wheeled frame having a forward end, a rearward end and opposite sides and four tub supports mounted on an upper surface of the wheeled frame, two supports being positioned forward on the frame and two supports being positioned rearward on the frame, thus forming a generally rectangular support base for the containment tub. The containment tub includes a base wall, at least two side walls, a front wall and a rear wall thereby defining an open-top containment tub. The tub also includes exterior and interior surfaces. Mounted on the containment tub on the exterior surface thereof are four pivotable support connectors which extend downward from the containment tub to each engage a respective one of the tub supports when the containment tub is mounted atop the wheezed frame. For securing the pivotable support connectors to the tub support, four releasable locking devices are mounted on the frame adjacent a respective one of the tub supports. The releasable locking devices act to secure the pivotable support connectors to the tub supports, and by alternately releasing two locking devices on one side of the frame, the containment tub may be tilted and pivoted about the pivot axis formed by the secured pivotable support connectors on that side of the frame. Reversal of the sides results in dumping to the opposite side of the frame. Finally, for lifting the containment tub to a tilting position for dumping of the materials therein, a lifting system is mounted on the wheeled frame beneath the containment tub.

14 Claims, 8 Drawing Sheets

BIDIRECTIONAL SIDE DUMP TRAILER

BACKGROUND OF THE INVENTION

1. Technical Field.

This invention relates to solid material transport trailers and, more particularly, to a bidirectional side dump trailer which includes a wheeled frame on which is pivotally mounted a containment tub, the pivot axes for the tub being generally parallel with the longitudinal axis of the wheeled frame. The containment tub is tilted and dumped by a lifting system mounted on the wheeled frame, the lifting system including a first power cylinder, a second power cylinder and a generally L-shaped cylinder connection link having a long arm and a short arm. One end of the first power cylinder is pivotally connected to the frame, as is the outer end of the short arm of the L-shaped link. The other end of the first power cylinder is connected to the L-shaped link at the intersection of the long arm and short arm, with the second power cylinder pivotally connected at one end to the outer end of the long arm of the L-shaped link and the other end of the second power cylinder is connected to the containment tub whereby when the first and second power cylinders are extended, the containment tub may be dumped in either direction.

2. Description of the Prior Art.

Many different types of trailers have been proposed and used in the moving of rock, dirt, gravel, and other types of solid materials. These trailers included such designs as the commonly-used rear dump trailer which includes a trailer dump body and an opening end gate for releasing the solid materials contained within the body. The forward end of the body is elevated by a hydraulic cylinder or the like in order to dump materials from within the trailer body. Of course, the major disadvantage associated with such rear dump trailers is that the solid material, when dumped, may only be deposited directly behind the dumping trailer thus severely restricting the usefulness of the trailer for any other purpose.

For example, when road construction is being undertaken, it is often necessary to dump large loads of rock and gravel along the sides of the elevated roadbed to prevent erosion of the roadbed. For conventional rear dump trailers to perform this operation would be very difficult due to the need for the trailer to be backed up to the edge of the road bed, dumped and then driven forward once more. There is therefore a need for a trailer which can perform such dumping operations with greater economy.

To overcome the problems encountered with the use of rear dump trailers, one directional side dump trailers were constructed. These side dump trailers did allow solid materials to be dumped from the side of the trailer rather than through the rear of the trailer, but the side dump trailers of the prior art still included numerous disadvantages. For example, several of the side dump trailers in the prior art do not dump solid materials far enough away from the trailer to preclude interference of the solid materials with the transport of the trailer. Furthermore, as the side dump trailers of the prior art only dump to one side, for the operator of the trailer to dump on another side of the rear bed requires him or her to reverse the direction of the trailer. Finally, several of the unidirectional side dump trailers do not include locking mechanisms to secure the solid material containment body in a transport position.

Rogers, U.S. Pat. No. 5,480,214, discloses a side dump trailer which can dump materials from either side of the trailer. The Rogers trailer, however, includes several deficiencies. For example, although the Rogers trailer permits side dumping from either side of the trailer, the operator of the trailer must exit the cab of the towing vehicle to engage or release the J-shaped slides which, when engaged, permit the trailer body to pivot to the left or the right of the trailer. This greatly decreases the efficiency with which the materials may be dumped by the Rogers trailer. Also, the Rogers trailer includes forward and rearward hydraulic cylinders which must extend simultaneously to properly dump solid materials held within the trailer body. Should one of the hydraulic cylinders fail, the resulting torque on the trailer body might well cause the body to twist and fail, thereby causing great damage to the trailer unit itself. The long length of the cylinders also can lead to mechanical problems. Finally, the length and shape of the tub of Rogers is impractical and inefficient, due to the long length of the tub (necessary to extend over the wheels) and the center reinforcement of the tub which prevents use of the tub for carrying long cargo such as logs and such. There is therefore a need for an improved bidirectional side dump trailer which addresses and solves the deficiencies found in the Rogers trailer.

An object of the present invention is thus to provide an improved bidirectional side dump trailer.

Another object of the present invention is to provide a bidirectional side dump trailer which includes a wheeled frame on which is pivotally mounted a containment tub, the containment tub mounted such that it may be dumped to the left or right of the frame.

Another object of the present invention is to provide a bidirectional side dump trailer in which the containment tub is mounted on the frame by a pair of supports on each side of the containment tub such that the containment tub may pivot and dump materials a sufficient distance from the wheeled frame so as to not interfere with the operation of the trailer.

Another object of the present invention is to provide a bidirectional side dump trailer in which the releasable securement of the tub to the frame is capable of being remotely controlled so that an operator of the trailer may dump from either side of the trailer without having to exit the cab of the towing vehicle.

Another object of the present invention is to provide a bidirectional side dump trailer which includes a lifting system mounted on the frame underneath the containment tub, the lifting system including first and second power cylinders and a generally L-shaped cylinder connection link which, when interconnected, coordinate to lift and tilt the containment tub to the left or right side of the trailer depending on which securement devices are engaged.

Finally, an object of the present invention is to provide a bidirectional side dump trailer which is less expensive to manufacture than those devices found in the prior art and is safe and efficient in use.

SUMMARY OF THE INVENTION

The present invention is directed to a bidirectional side dump trailer which includes a wheeled frame having a forward end, a rearward end and opposite sides and four tub supports mounted on an upper surface of the wheeled frame, two supports being positioned forward on the frame and two supports being positioned rearward on the frame, thus forming a generally rectangular support base for the containment tub. The containment tub includes a base wall, at least two side walls, a front wall and a rear wall thereby defining an open-top containment tub. The tub also includes exterior and interior surfaces. Mounted on the containment tub on the exterior surface thereof are four pivotable support connectors which extend downward from the containment tub to each engage a respective one of the tub supports when the containment tub is mounted atop the wheeled frame. For securing the pivotable support connectors to the tub support, four releasable locking devices are mounted on the frame adjacent a respective one of the tub supports. The releasable locking devices act to secure the pivotable support connectors to the tub supports, and by releasing two locking devices on one side of the frame, the containment tub may be tilted and pivoted about the pivot axis formed by the secured pivotable support connectors on the opposite side of the frame.

For lifting the containment tub to a tilting position for dumping of the materials therein, a lifting system is mounted on the wheeled frame beneath the containment tub. The lifting system includes a first power cylinder, a second power cylinder and a generally L-shaped cylinder connection link having a long arm and a short arm each having outer ends. The outer end of the short arm of the L-shaped link is pivotally mounted on the wheeled frame such that the pivot axis of the short arm is generally parallel with the pivot axes of the pivotable support connectors. From this pivot connection, the short arm extends generally upward at an angle until connecting with the long arm of the L-shaped cylinder connection link. One end of the first power cylinder is pivotally connected to the wheeled frame spaced from the pivotal mount of the short arm, the other end of the first power cylinder is pivotally connected to the L-shaped link intermediate the outer ends of the long and short arms. The long arm extends over the pivotal connection of the first power cylinder to the frame. One end of the second power cylinder is pivotally connected to the outer end of the long arm of the L-shaped link with the other end of the second power cylinder pivotally connected to the underside of the containment tub. Finally, a selective engaging device is provided for selectively engaging the first and second power cylinders whereby the containment tub is lifted to pivot about the pivotable support connectors on one side of the frame upon securement of the pivotable support connectors on the opposite of the frame to the tub support. The containment tub may be dumped in the opposite direction by securement and release of the opposite pivotable support connectors.

It is thus seen that the present invention provides a substantial improvement over those devices of the prior art. The present invention may dump solid materials to either side of the wheeled frame without inhibiting the transport characteristics of the wheeled frame due to the outwardly dumping nature of the containment tub. Furthermore, the lifting system employed by the present invention will not result in damage to the tub should one of the power cylinders fail, as the force being applied to the containment tub is being exerted from beneath the tub and not on the sides, front or rear. Furthermore, the releasable locking devices of the present invention may be engaged or disengaged remotely, thus allowing an operator of the trailer to dump from either side of the trailer without having to leave the safety of the cab of the trailer. Finally, the integral nature of the pivotable support connectors provides for longer life and a higher degree of safety for the bidirectional side dump trailer of the present invention. It is thus seen that the present invention provides the substantial improvement over the prior art.

DESCRIPTION OF THE PREFERRED EMBODIMENT

Figure 1:
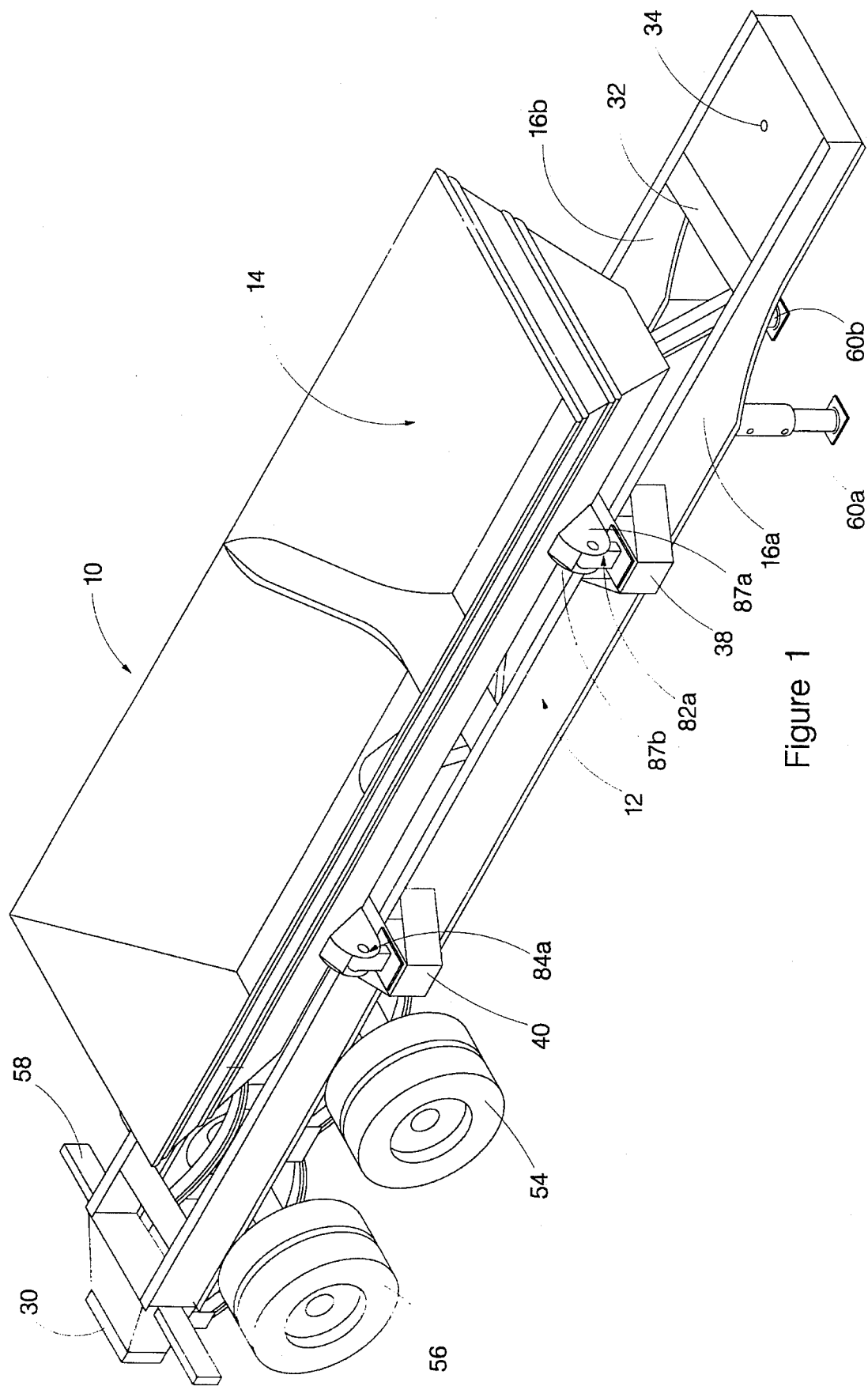
FIG. 1 is a perspective view of the trailer and tub.
Figure 2:
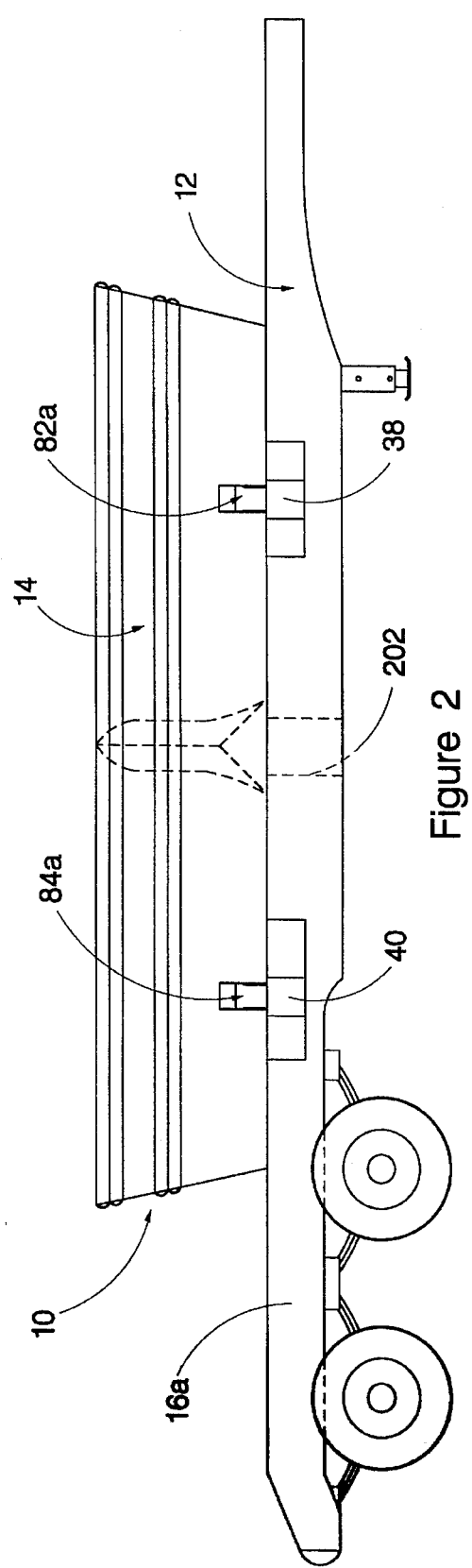
FIG. 2 is a side elevational view of the trailer and tub.
Figure 3:
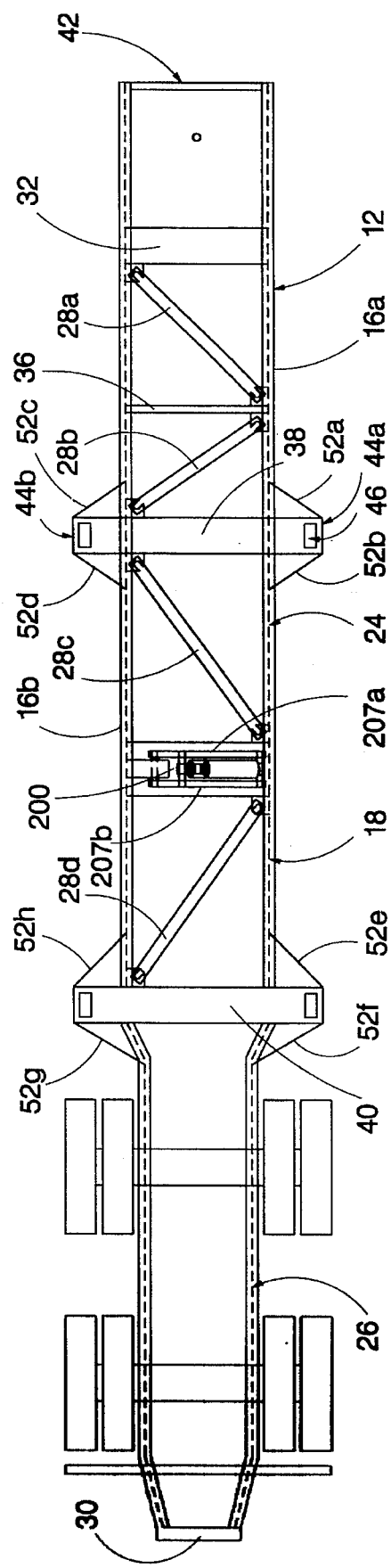
FIG. 3 is a top plan view of the trailer without the tub mounted thereon thus showing the trailer construction.

The bidirectional side dump trailer 10 of the present invention is best shown in FIGS. 1–3 as including a wheeled trailer 12 on which is pivotably mounted a containment tub 14. The wheeled frame 12, as shown in FIGS. 2 and 3, includes two main frame support members 16a and 16b which extend the entire length of the frame 12. In the preferred embodiment, the overall length of the wheeled frame 12 is approximately 40 feet, with the distance between the main frame support members 16a and 16b varying from approximately 48 inches at the midpoint of the frame down to approximately 24 inches at the rear end of the wheeled frame 12. It is preferred that each of the main frame support members 16a and 16b be constructed of high-tensile strength steel having a yield of approximately 175,000 and a Burnell rating of approximately 400. The main frame support members 16a and 16b are substantially identical to one another and therefore the following description of the main frame support member 16a should be understood to apply to main frame support member 16b as well.

The main frame support member 16a is preferably constructed having a generally I-beam type construction which includes a generally vertical web member 18, a top flange 20 and a lower flange 22. The main frame support member 16A is preferably constructed by adjoining two sections of the web 18, a forward section 24 and rearward section 26, the two sections connected to one another at a position approximately two-thirds of the overall length of the frame 12 rearwards from the front edge 42 of the frame 12. The web 18 is formed in two sections due to the frame shape requirements as best shown in FIG. 3 and would preferably have a thickness of ⅜" to ⅝". The forward section 24 of web 18 is generally straight and varies in height from approximately 12" adjacent the front edge 42 of frame 12 to approximately 24" at the midpoint of the frame 12, whereas the rearward section 26 of web 18 has a height of approximately 18" and includes two angles which narrow the overall width of the frame 12 to permit mounting of the trailer wheels 54 and 56 on the frame 12. The angles in the rearward section 26 of web 18 would be formed by standard bending techniques and the forward and rearward sections 24 and 26 of web 18 would be joined with one another by welding or similar adjoining means. Obviously, the point at which the forward and rearward sections 24 and 26 of web 18 are joined could be a potentially weak area of the frame 12. The frame 12 of the present invention thus includes top and lower flanges 20 and 22 of the support member 16a which, in the preferred embodiment, are continuous metal strips extending the length of frame 12 which are welded to the top and bottom respectively of web 18 of main frame support members 16A. The top and lower flanges 20 and 22 are preferably constructed of flat steel having a width of approximately four inches and a thickness of approximately 3/16 inch to 5/8 inch, the use of flat steel permitting the top and lower flanges 20 and 22 to be bent and curved to conform to the contours of web 18, as shown best in FIG. 2. The continuous nature of the top and lower flanges 20 and 22 thus provide a solid structural base for the trailer 10.

Main frame support members 16a and 16b are securely connected to one another in spaced apart relation by a series of diagonal frame support struts 28a, 28b, 28c, and 28d which, in the preferred embodiment, would be constructed of any appropriately shaped steel bar stock, such as C-channel, square tubing or I-beam construction. Of course, the support struts 28a–d may be arranged on the frame 12 in different ways than that shown in FIG. 3, and, in fact, may include a greater or fewer number of struts 28a–d than that shown, so long as the frame 12 is sufficiently rigid to support the containment tub 14. The two main frame support members 16a and 16b are also secured to one another at the rear end by a bumper 30 and at the forward end by a bulkhead 32 in front of which is mounted the trailer king pin plate and pin 34 which allows the trailer 10 to be secured to the towing vehicle in a cab and trailer combination. One or more spacer bars 36 may also extend between the main frame support members 16a and 16b to provide additional structural support for the frame 12.

Mounted on frame 12 are a forward tub support beam 38 and a rearward tub support beam 40, the forward tub support beam 38 spaced approximately one-third of the frame length from the forward end 42 of the frame 12 and the rearward tub support beam spaced approximately two-thirds the length of the frame 12 from the forward end 42 of the frame 12. In the preferred embodiment, forward tub support beam 38 and rearward tub support beam 40 are substantially identical in all respects including how they are seated on frame 12, and therefore the following description of forward tub support beam 38 shall be understood to apply to rearward tub support beam 40.

Forward tub support beam 38 is preferably constructed of steel tubing having a height of approximately 12 inches, a width of approximately 66 inches, and a wall thickness of approximately one-half inch. It is preferred that forward tub support beam 38 be mounted on main frame support members 16a and 16b within two generally square removed sections of main frame support member 16a and 16b, each removed section having the same general cross sectional shape as the forward tub support beam 38. As thus secured, forward tub support beam 38 extends between main frame support member 16a and 16b to provide further structural strength to the frame 12. As the frame 12 at forward tub support beam 38 is approximately 48 inches in width, approximately nine inches of the beam 38 extends outward past each side of the frame 12, as shown in FIG. 1 and 3. These outer sections 44a and 44b of forward tub support beam 38 are best shown in FIGS. 4–7. As the outer sections of 44a and 44b are substantially identical, outer section 44a of forward tub support beam 38 will be described hereafter but is to be understood that the description shall apply equally to outer section 44b.

As shown in FIG. 3, outer section 44a of forward tub support beam 38 includes a generally rectangular wedge-receiving aperture 46 which is approximately 6" to 8" in length and 2" to 3" inches in width. Angling inward and downwards from wedge-receiving aperture 46 are walls 48a and 48b which cooperate with wedge-receiving aperture 46 to form a wedge-receiving slot 50 extending downwards into forward tub support beam 38. It is preferred that the walls 48a and 48b of wedge-receiving slot 50 have a thickness of approximately 1/4–1/2 inch. Wedge-receiving slot 50 is thus designed to receive one of the wedge-shaped support connectors mounted on the tub 14 as will be described later in this disclosure.

For securely mounting the forward and rearward tub support beams 38 and 40 to the main frame support members 16a and 16b, a plurality of diagonal beam support struts 52a–h are connected to extend outwards from a respective one of the main frame support members 16a and 16b to the outer ends of the forward and rearward tub support beams 38 and 40 as shown best in FIG. 3. It is preferred that the beam support struts 52a–h be securely welded to the main frame support members 16a and 16b and the forward and rearward tub support beams 38 and 40 to prevent deflection of the forward and rearward tub support beams 38 and 40 when the containment tub 14 is secured thereon. The beam support struts 52a–h are preferably constructed of any rigid steel strut shape, such as C-channel or angle steel.

Wheeled frame 12 would also include, in the preferred embodiment, wheel and axle assemblies 54 and 56 mounted on the rear end of wheeled frame 12, a light bar 58 for mounting of braking and turning lamps and one or more trailer feet 60a and 60b for supporting the forward end of the frame 12 when disconnected from a towing vehicle. Other commonly-used trailer features may be added or removed from the wheeled frame 12 as required by the needs of the trailer user.

Containment tub 14 is shown best in FIGS. 1, 2, 8 and 9 as including forward and rearward walls 62 and 64, side walls 66a and 66b and a base wall 68. In the preferred embodiment, the containment tub 14 would have a top length of approximately 24 feet, a bottom length of approximately 22 feet, a top width of approximately 8 feet, a bottom width of approximately 2 feet 6 inches and a height of approximately 4 feet 6 inches, thus resulting in a volume of approximately 20 cubic yards. It is thus preferred that forward and rearward walls 62 and 64 of containment tub 14 have approximately the same generally trapezoidal shape and that the two side walls 66a and 66b of containment tub 14 each have approximately the same trapezoidal shape. It is preferred that the base wall 68 have a width of approximately 2 feet and a length of approximately 22 feet so that when the four walls 62, 64, 66a and 66b of containment tub 14 are mounted on the base wall 68 and connected to one another, the upwardly and outwardly divergent containment tub 14 of the present invention is formed. As an additional feature of the containment tub 14 of the preferred embodiment of the present invention, the connection of the base wall 68 to forward wall 62, rear wall 64, and side walls. 66a and 66b may be accomplished by a series of curved joint sections each connecting the base wall 68 to a respective one of the forward wall 62, rearward wall 64 and side walls 66a and 66b. The curved connection of the walls 62, 64, 66A and 66B to base wall 68 would permit cleaner flow of particulate materials from the containment tub 14 when it is being dumped, thus increasing the efficiency of the dumping process. Of course, the joining of walls 62, 64, 66a and 66b to base wall 68 may be accomplished by any acceptable method such as welding or the like. As was discussed previously in connection with frame 12, it is preferred that the containment tub 14 be constructed of high-tensile strength steel such as those known under the brand names "Formalloy" or "Hardox" which will result in a strong yet relatively light containment tub 14 being formed.

Figure 8:
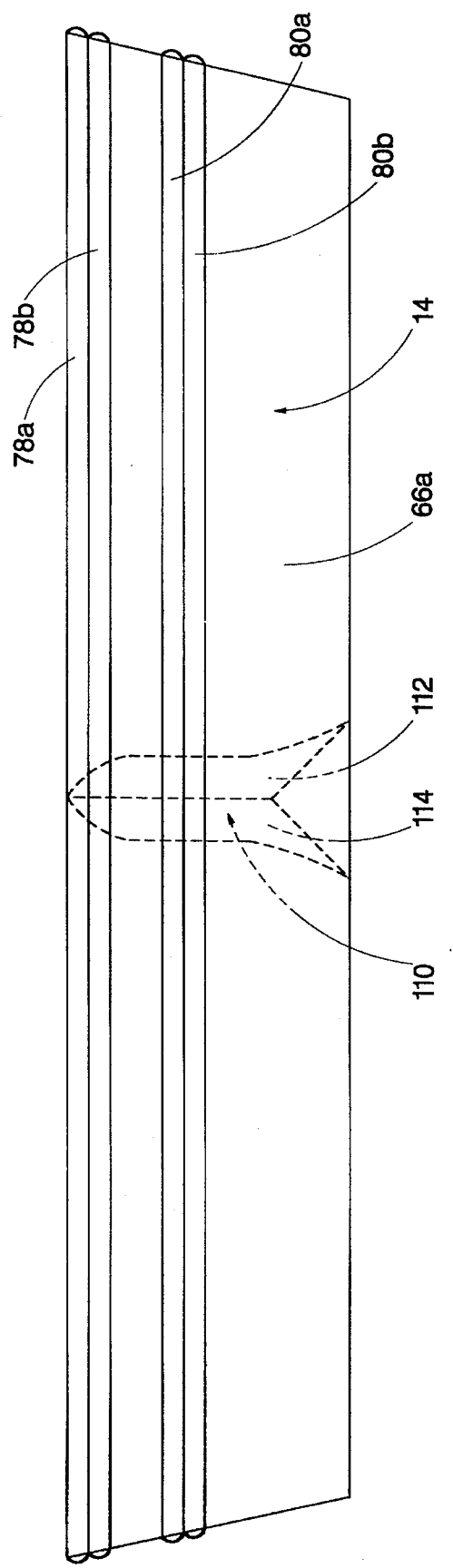
FIG. 8 is a partial side elevational view showing the tub by itself.

To provide additional structural strength for tub 14 and further to permit the use of thinner steel for forward and rearward walls 62 and 64 and side walls 66a and 66b, a plurality of steel reinforcement bands 78a, 78b, 80a and 80b are welded onto the containment tub 14 as shown in FIG. 2 and FIG. 8. In the preferred embodiment, the top reinforcement band 78a and 78b and lower reinforcement bands 80a and 80b would each be constructed of bar steel having a partial cylindrical cross-section and which, in the embodiment shown in FIG. 2, would have a thickness of 7 gauge, an arc radius of approximately 2 and 3/16 inches, and be curved in an arc of approximately 123 degrees. In the preferred embodiment, the top and lower reinforcement bands 78a, 78b, 80a, and 80b extend completely around the outer circumference of containment tub 14 and are welded to containment tub 14 in the configuration shown in FIGS. 1, 2 and 8. It is preferred that the top reinforcement bands 78a and 78b be welded to the containment tub 14 along three weld beads, one at the top of reinforcement band 78a, one connecting reinforcement band 78a and reinforcement band 78b to the containment tub 14 and a third at the bottom of reinforcement band 78b. Lower reinforcement bands 80a and 80b would be secured to the containment tub 14 in a similar manner. This method of securement of reinforcement bands 78a, 78b, 80a and 80b has been determined to provide a significant increase in the structural strength of the containment tub 14.

Finally, at the corners of the reinforcement bands 78a, 78b, 80a and 80b, a plurality of partial spherical corner sections would be provided to connect and secure the straight sections of the reinforcement bands to one another. Of course, it is to be understood that various types of reinforcement bands may be used for the present invention, so long as the substituted reinforcement bands fulfill the same strengthening functions as the reinforcement bands 78a, 78b, 80a and 80b.

For mounting containment tub 14 on wheeled frame 12, forward pivotable support connectors 82a and 82b and rearward pivotable support connectors 84a and 84b are mounted on containment tub 14 as shown in FIGS. 1 and 4–7. Each of the pivotable support connectors 82a, 82b, 84a and 84b is mounted on one of the sidewalls 66a and 66b of containment tub 14, specifically with forward and rearward pivotable support connectors 82a and 84a mounted on side wall 66a and forward and rearward pivotable support connectors 82b and 84b mounted on side wall 66b. Each of these pivotable connectors 82a, 82b, 84a and 84b are substantially identical to one another, and therefore the following description of forward pivotable support connector 82a should be understood to apply equally to the other pivotable support connectors 82b, 84a and 84b.

Figure 7:
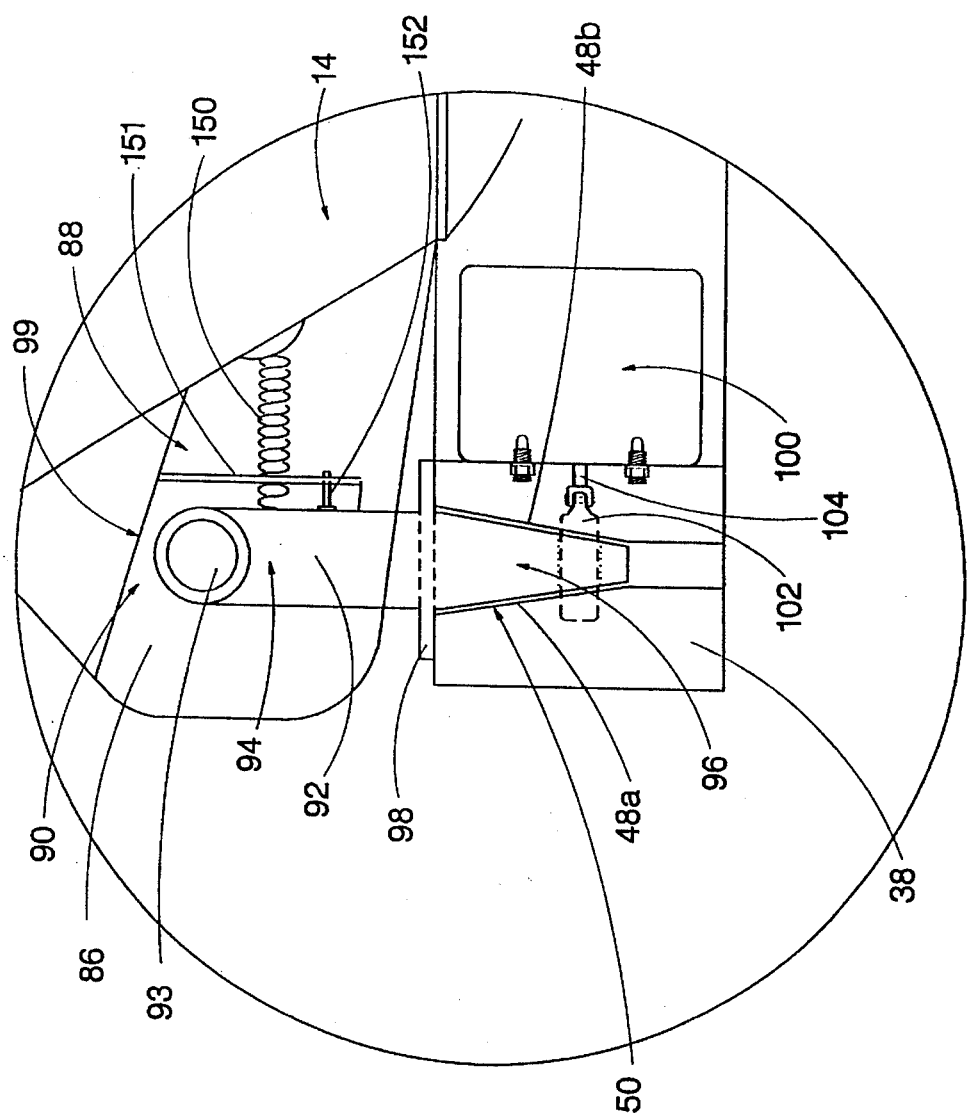
FIG. 7 is a partial detail view of the wedge seated within the slot.

Forward pivotable support connector 82a, in the preferred embodiment, would include a wedge mount block 86 which includes a pair of generally parallel upright plates 87a and 87b each including a tub mount section 88 and an outer wedge mount section 90, as shown best in FIG. 7. The parallel upright plates 87a and 87b are connected to one another by a bridge plate (not shown) which mounts to the side wall 66a. Of course, for structural strength reasons, it is preferred that wedge mount block 86 would be formed of a single piece of steel, but for explanation purposes can be described as including the parallel upright plates 87a and 87b each having a tub mount section 88 and wedge mount section 90. It is preferred that wedge mount block 86 be constructed of high tensile-strength steel having a thickness preferably greater than one-half inch. Pivotably mounted between parallel upright plates 87a and 87b on wedge mount section 90 is tub mount wedge bar 92 which is preferably constructed of a section of steel bar having a generally square or rectangular cross-sectional shape and including an upper mounting section 94 and lower wedge section 96, as shown in FIG. 7. It is preferred that upper mount section 94 be connected to a cylindrical pivot joint 93 mounted on and extending between parallel upright plates 87a and 87b of wedge mount block 86 such that tub mount wedge bar 92 may pivot about a pivot axis aligned generally parallel with longitudinal axis of the containment tub 14.

The dimensions of lower wedge section 96 of tub mount wedge bar 92 are such that the widest part of wedge section 96 is slightly smaller than wedge-receiving aperture 46 and wedge-receiving slot 50 of forward tub support beam 38. Lower wedge section 96 may thus slide into wedge-receiving slot 50 as was previously described. Of course, it is important to prevent lower wedge section 96 from entering too deeply into wedge-receiving slot 50, as contact between tub mount wedge bar 92 and the walls 48a and 48b of wedge-receiving slot 50 may result in the wedge bar 92 becoming stuck within the wedge-receiving slot 50 due to friction or friction weld characteristics. It is therefore important to provide a wedge stop plate 98 securely mounted on upper mount section 94 as shown in FIG. 7 or on the upper part of lower wedge section 96, wedge stop plate 98 contacting the upper surface of forward tub support beam 38 when tub mount wedge bar 92 is housed within wedge-receiving slot 50. The weight of containment tub 14 and any cargo therein would thus rest on the wedge stop plate 98, and therefore it is critical that wedge stop plate 98 be of sufficient strength to support that weight. Wedge stop plate 98 would thus preferably have a thickness of at least 3/8".

Finally, for securing tub mount wedge bar 92 within wedge-receiving slot 50, the lower wedge section 96 of tub mount wedge bar 92 would include a generally cylindrical bore hole passing transversely through lower wedge section 96 generally adjacent to the lower end of the tub mount wedge bar 92. Housed within forward tub support beam 38 is an air-actuated pin securement system 100, shown best in FIG. 7. The pin securement system 100 includes a slidably mounted generally cylindrical pin 102 operatively connected to a pneumatic pin extender 104 which alternatively extends or retracts pin 102 as shown in FIG. 7. When pin 102 is retracted, tub mount wedge bar 92 may be freely inserted and removed from wedge-receiving slot 50. However, when tub mount wedge bar 92 is housed within wedge-receiving slot 50 and pin 102 is extended outwards by pneumatic pin extender 104, pin 102 extends through the cylindrical hole extending through lower wedge section 96 of pin mount wedge bar 92 and through wall 48a of wedge-receiving slot 50, thus securing tub mount wedge bar 92 within wedge-receiving slot 50. The air-actuated pin securement system 100 as thus described permits the operator of the trailer 10 to extend or retract the pins within the forward and rearward tub support beams 38 and 40 by toggling switches within the cab of the towing vehicle. It is preferred that two toggle switches be provided, one for operating the pin securement systems on the left side of the trailer 10 and the other toggle switch for operating the pin securement systems on the right side of the trailer 10 although this is not critical to the invention.

Figure 4:
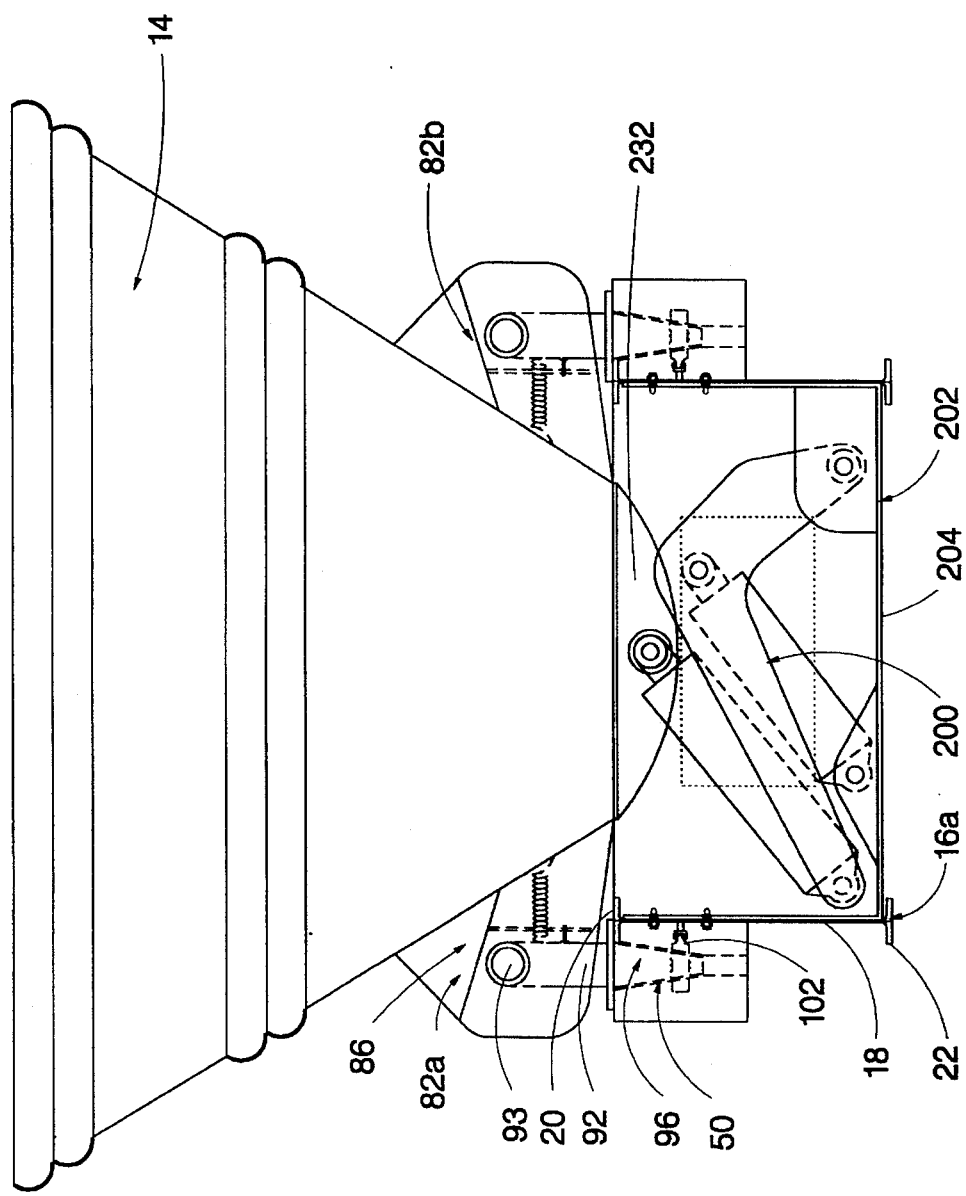
FIG. 4 is a partial front elevational view of the hydraulic cylinder lifting system as it sits in the well mounted on the trailer frame.
Figure 5:
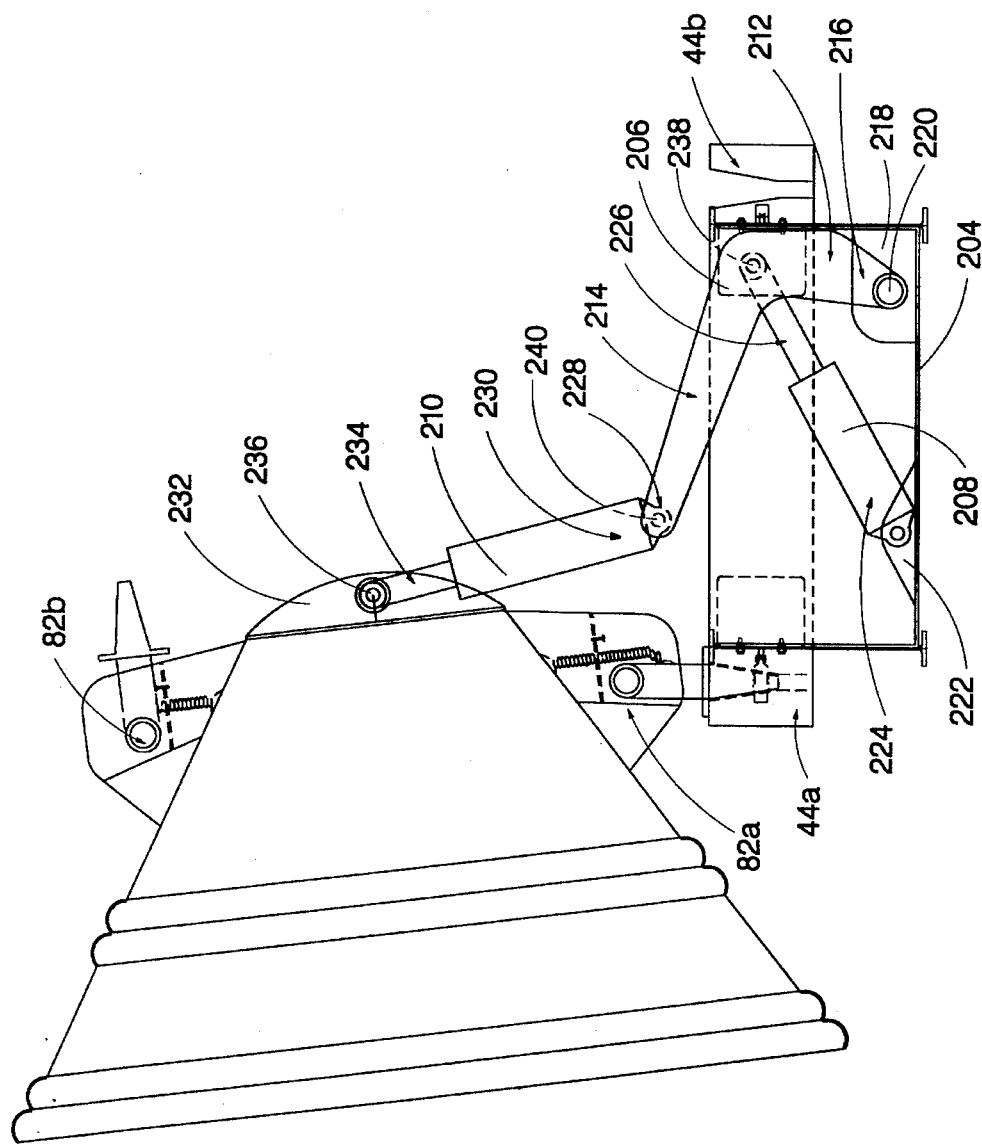
FIG. 5 is a partial front elevational view as in FIG. 4 showing the tub being dumped.

For lifting and pivoting containment tub 14 over frame 12, a lifting system 200 is mounted on frame 12 as shown best in FIGS. 4 and 5. In the preferred embodiment, the lifting system 200 will be mounted within a lifting well 202 consisting of a steel box extending the width of frame 12 and having a base wall 204 having a thickness of approximately ⅝ inches. The base wall 204 may also be reinforced should such reinforcement be deemed necessary.

Lifting system 200 preferably includes a generally L-shaped cylinder connection link 206, a first hydraulic cylinder 208 and a second hydraulic cylinder 210. It is preferred that the L-shaped cylinder connection link 206 be constructed of high tensile-strength steel and include a short arm 212 and long arm 214, the short arm having a length of approximately 10" to 24" and the long arm having a length of approximately 24" to 36". In the preferred embodiment, the L-shaped cylinder connection link 206 would consist of two identical steel plates 207a and 207b, as shown in FIG. 3, both having the same general L-shape and the plates being connected to one another in spaced apart parallel relation. The distance between the two plates could be varied as necessary to accommodate the first and second hydraulic cylinders 208 and 210 therebetween, but in the preferred embodiment the distance between the two plates of the L-shaped cylinder connection link 206 would between 6 inches and 24 inches. The L-shaped cylinder connection link 206 is mounted to the frame 12 by a frame pivot mount 218 which, in the preferred embodiment, is constructed of a pair of parallel, spaced-apart ⅜" thick generally rectangular steel plates extending upwards generally perpendicular to the base wall 204 and main frame support members 16a and 16b of frame 12. A cylindrical pivot mount 220 extends through frame pivot mount 218 and is pivotably connected to the outer end 216 of the short arm 212 of L-shaped cylinder connection link 206, thus permitting cylinder connection link 206 to pivot freely about frame pivot mount 218.

First hydraulic cylinder 208 is pivotably mounted on base wall 204 by a pivot mount 222 which, in the preferred embodiment, would include a pair of generally triangular steel plates mounted on the base wall 204 in spaced apart relation generally parallel with one another and generally perpendicular to base wall 204, the pivot mount 222 including a rod extending between the two upright plates on which the cylinder end 224 of first hydraulic cylinder 208 would be pivotably mounted. The rod end 226 of first hydraulic cylinder 208 is pivotably connected to L-shaped cylinder connection link 206 at the connection of short and long arms 212 and 214, as shown in FIGS. 4 and 5. The pivotal connection of rod end 226 may be of various forms, however it is preferred that a first cylinder connection rod 238 extend between the plates of L-shaped cylinder connection link 206, the rod extending through the cylinder mounted on rod end 226 thus pivotably connecting rod end 226 of first hydraulic cylinder 208 to L-shaped cylinder connection link 206.

Pivotably mounted to the outer end 228 of long arm 214 is the cylinder end 230 of the second hydraulic cylinder 210, the pivotable connection being performed in substantially the same manner as described previously in connection with rod end 226 of first hydraulic cylinder 208 with a second cylinder connection rod 240 extending between the plates 207a and 207b adjacent the outer ends of the long arms thereof. Second hydraulic cylinder 210 then extends upwards and inwards to be pivotably connected to the base of containment tub 14. An arcuate cylinder connection plate 232 is mounted to the underside of base wall 68 of containment tub 14 as shown in FIG. 4. It is preferable that arcuate cylinder connection plate 232 consist of two spaced apart generally parallel steel plates having a cylinder connection rod 236 extending perpendicularly between and mounted to the plate, the cylinder connection plates 232 positioned at approximately the mid-point of containment tub 14. The rod end 234 of second hydraulic cylinder 210 is then connected to this cylinder connection rod 236 to permit pivotable motion of the rod end 234 about cylinder connection rod 236.

Figure 6:
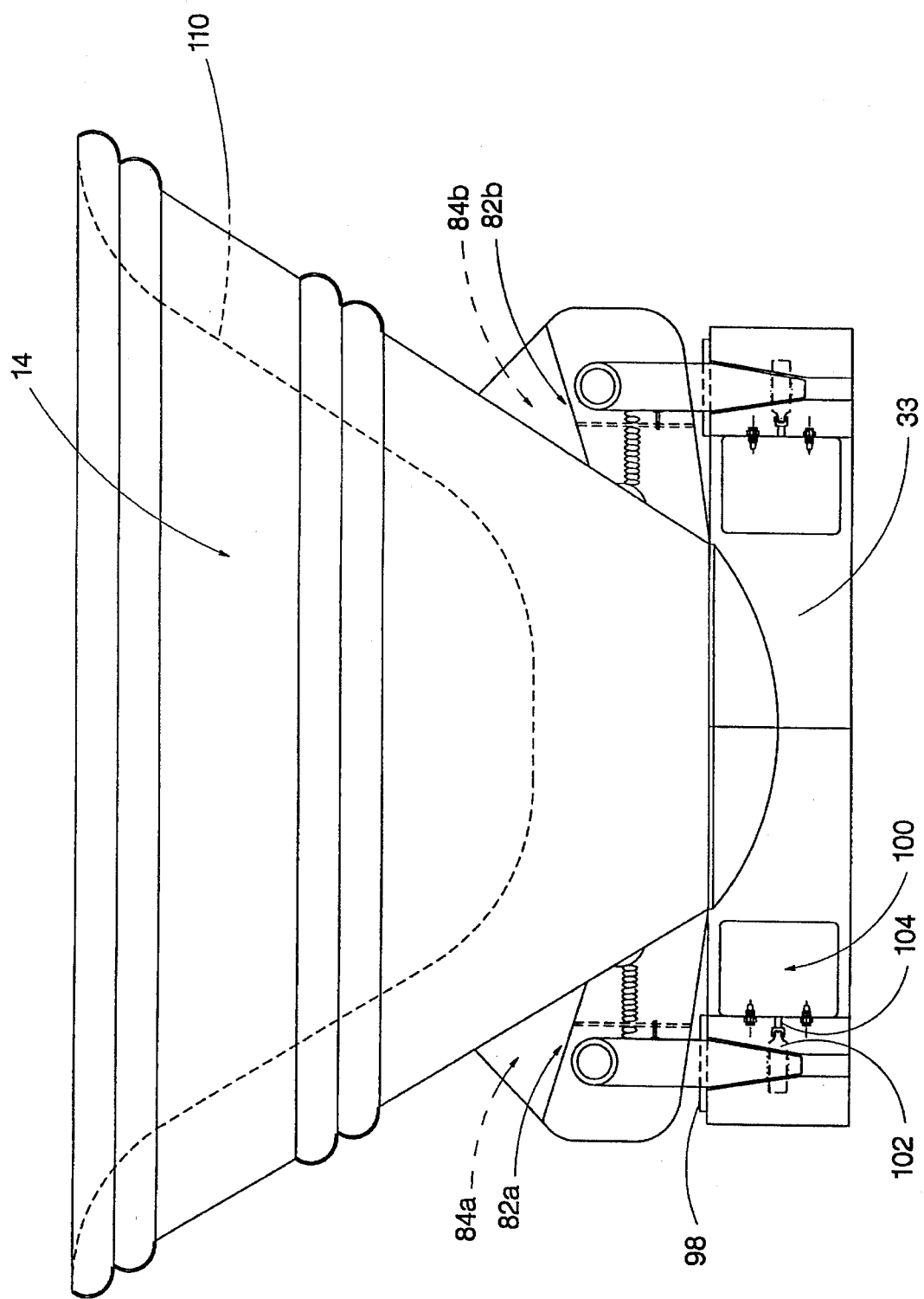
FIG. 6 is a partial front elevational view further showing the tub mounted on the frame.
Figure 9:
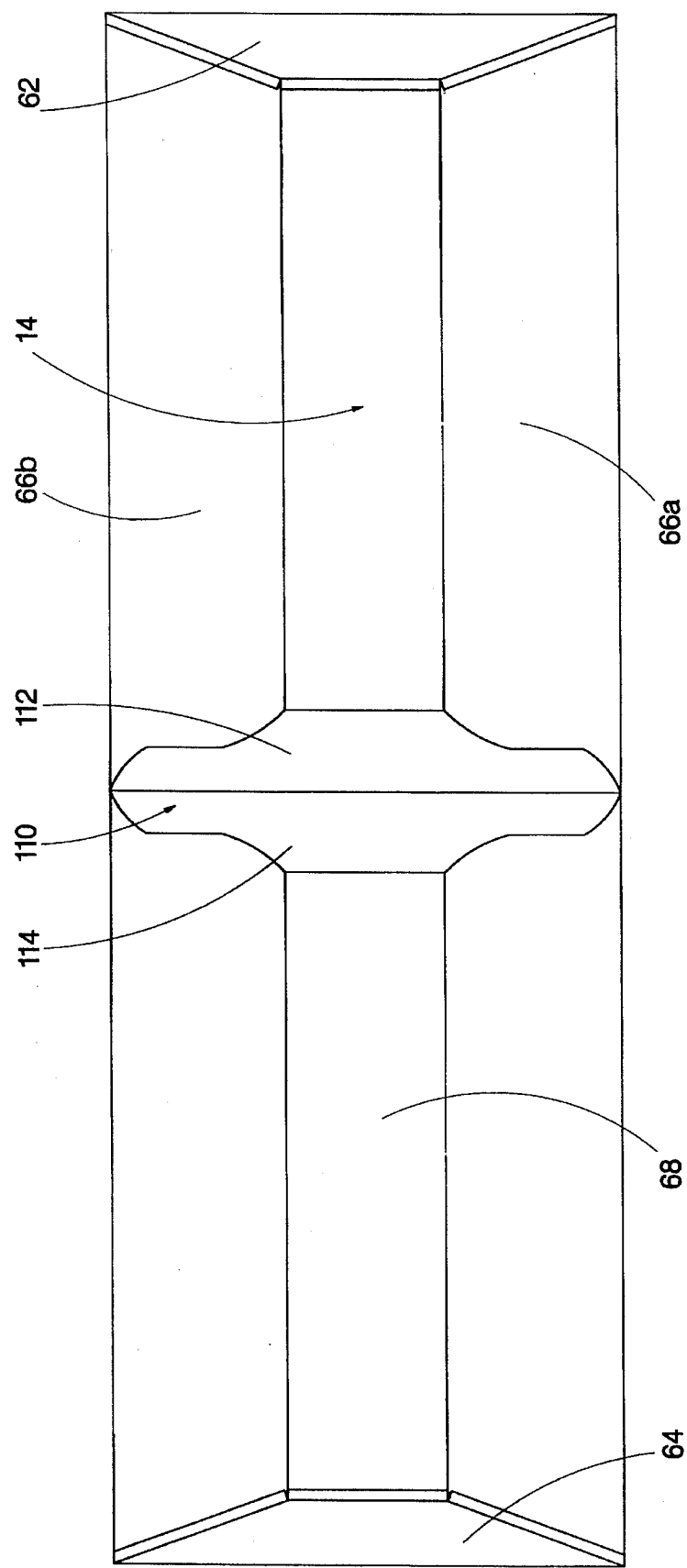
FIG. 9 is a top plan view of the tub showing the tub interior and V-cross-section center support.

It is obvious that the stress on base wall 68 containment tub 14 is extreme at the connection of arcuate cylinder connection plate 232 thereto. Therefore, for this reason and for further structural strength for the containment tub 14 it is important to provide a central tub reinforcement structure 110 mounted within tub 14 as shown in FIGS. 1, 6, and 9. It is preferred that central tub reinforcement structure 110 have a generally inverted V-shaped cross-sectional shape including front and rear walls 112 and 114 angling upwards and inwards, mounted on base wall 68 and side walls 66a and 66b and connecting to one another to form the shape of reinforcement structure 110. An important feature of the reinforcement structure 110 is that the top of the inverted V-shape does not extend to the top of containment tub 14, but instead extends only one to two feet upwards from base wall 68. Therefore, the containment tub 14 of the present invention may carry long objects such as trees and other lawn debris, as opposed to those devices and trailers found in the prior art. The reinforcement structure 110 of the present invention thus is superior to those other types of reinforcement structures presently used.

The dumping operation of the trailer 10 of the present invention would be undertaken as follows. Upon reaching the location at which the material housed within the containment tub 14 is to be dumped, the operator would toggle the pneumatic activation switch associated with the left or right side of the trailer depending on the side on which the dump is to take place. For example, the operator, if wishing to dump off the right side of the trailer as defined by the forward movement of the trailer, would activate the toggle for the left side of the trailer thus disengaging the securement pins of the pin securement systems on the left side of the trailer thus releasing the forward pivotable support connector 82b and rearward pivotable support connector 84b from forward and rearward tub support beams 38 and 40 respectively. Forward and rearward pivotable support connectors 82a and 84a would still be secured within their respective wedge-receiving slot. The trailer operator at this time would engage the first and second hydraulic cylinders 208 and 210 of lifting system 200 via hydraulic controls housed within the cab of the towing vehicle. As shown in FIG. 5, first hydraulic cylinder 208, upon extending, would pivot the L-shaped cylinder connection link 206 about cylindrical pivotable mount 220 until short arm 212 of L-shaped cylinder connection link 206 was tilted adjacent main frame support member 16b. The activation of first hydraulic cylinder 208 would thus cause long arm 214 of L-shaped cylinder connection link 206 to be titled upwards as the angle between long arm 214 and short arm 212 of the L-shaped cylinder connection link 206 is approximately 95 degrees–120 degrees. The extension of second hydraulic cylinder 210 forces containment tub 14 to pivot about forward and rearward pivotable support connectors 82a and 84a as shown in FIG. 5, thus emptying the contents of containment tub 14. It is expected that the arrangement of lifting system 200 will require a pressure exerted by the hydraulic system of approximately 2,500–3,000 p.s.i., which equates to a displacement of approximately 3.5 gallons of hydraulic fluid for a dump on the right side of the trailer, as shown in FIG. 5, and a displacement of approximately 2.7 gallons of hydraulic fluid for a containment tub dump to the opposite side.

For a dump in the opposite direction, the above-description would be equally valid, the only change being that forward and rearward pivotable support connectors 82a and 84a would be released and forward and rearward pivotable support connectors 82b and 84b would be secured in their respective wedge-receiving slot.

While the trailer 10 of the present invention would most likely be connected by hydraulic lines to the hydraulic system of the towing vehicle for supplying fluid flow thereto, it is contemplated that a self-contained hydraulic fluid system could be housed within the well 202. Such a system would include a small but powerful diesel or gas engine connected to an hydraulic fluid pump. A fuel tank would be connected to the engine, and the pump would be placed in fluid flow connection with an hydraulic fluid tank and the fluid lines leading to the first and second hydraulic cylinders 208 and 210. An operator would start the engine and the pump would force hydraulic fluid to the cylinders to extend them, thus lifting and tilting the containment tub 14 away from frame 12. Of course, the diesel engine could be replaced by any appropriate power device, such as an electric motor.

It has been found that following the dumping of material from the containment tub 14 and the lowering of tub 14 to its original transport position, it becomes necessary to align the wedges of the released pivotable support connectors with the wedge-receiving slots so that the wedges may slide therein. FIG. 7 exhibits a solution to this problem in that the tub mount wedge bar 92 is elastically secured to the adjacent side wall 66a of containment tub 14 by spring 150 or the like, thus pivoting tub mount wedge bar 92 inwards toward the containment tub 14. Of course, the tub mount wedge bar 92 may be secured to the wedge mount block 86 in the alternative. A positioning screw 152 is mounted on a slotted plate 151 through which spring 150 passes to prevent tub mount wedge bar 92 from pivoting past the end of positioning screw 152. In this manner, as the containment tub 14 is lowered into its original transport position, the tub mount wedge bar 92 is aligned to slide into wedge-receiving slot 50. Each of these pivotable support connectors 82a, 82b, 84a and 84b would include a similar positioning system.

The pivotable support connector 82a would preferably also include a pivot stop plate 99 or the like extending between and connected to the plates 87a and 87b of wedge mount block 86 for preventing rotation of the tub mount wedge bar 92 beyond a certain point when the tub 14 is being pivoted about the cylindrical pivot connection 93. This prevents the tub 14 from overrotating during the dumping process, thus preventing damage to the lifting system 200.

The unique aspects of the present invention thus being set forth, it is clear that the present invention provides a substantial improvement over those trailers found in the prior art. As the trailer dumping operation can be completed without the operator of the trailer having to leave the cab of the towing vehicle, dumping operation efficiency is greatly increased, along with the safety of the operator. Furthermore, the non-intrusive nature of the central tub reinforcement structure 110 permits the carrying of debris and objects of extended lengths, a feature not found in those trailers of the prior art. Finally, due to the construction materials used and overall design of the trailer 10, the weight of the trailer is substantially reduced, thus permitting heavier loads to be carried within containment tub 14, as the gross vehicle weight restrictions imposed on roadway travel will not be exceeded.

It is to be understood that numerous modifications, substitutions and additions may be made to the trailer of the present invention which will still fall within the intended broad scope of the appended claims. For example, the sizes and dimensions given in the above description may be easily modified without affecting the functioning ability of the present invention. Furthermore, commonly understood modifications such as addition of the third axle and wheel combination or modification to "goose-neck" trailer configuration are contemplated. Alternatively, once the frame of the present invention is constructed, it may be mounted on any desired vehicle such as a dump truck or other such trailer unit, as the frame need not be an integral part of the transportation means. Finally, reorientation of the various features of the present invention can be undertaken without modifying the underlying functionality of the invention.

There has thus been shown and described a bidirectional side dump trailer which accomplishes all of the stated objectives.

I claim:

1. A bidirectional side dump trailer comprising:

a wheeled frame having a forward end, a rearward end and opposite sides;

first and second forward tub supports mounted on said wheeled frame adjacent said forward end of said wheeled frame, said first forward tub support adjacent one side of said wheeled frame and said second forward tub support adjacent the other side of said wheeled frame;

first and second rearward tub supports mounted on said wheeled frame adjacent said rearward end of said wheeled frame, said first rearward tub support adjacent one side of said wheeled frame and said second rearward tub support adjacent the other side of said wheeled frame;

a containment tub including a base wall, at least two side walls, a front wall and a rear wall thereby defining an open-topped containment tub having exterior and interior surfaces;

first and second forward pivotable support connectors mounted on said exterior surface of said containment tub adjacent said front wall;

first and second rearward pivotable support connectors mounted on said exterior surface of said containment tub adjacent said rear wall;

said containment tub being pivotably mounted on said wheeled frame by releasable connection of each of said first and second forward pivotable support connectors to a respective one of said first and second forward tub supports, and releasable connection of each of said first and second rearward pivotable support connectors to a respective one of said first and second rearward tub supports;

first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;

a lifting system mounted on said wheeled frame intermediate said forward and rearward ends, said lifting system including a first power cylinder, a second power cylinder and a generally L-shaped cylinder connection link having a long arm and a short arm each having outer ends, said outer end of said short arm of said L-shaped link pivotally mounted on said wheeled frame such that the pivot axis of said short arm is generally parallel with a pivot axis of one of said pivotable support connectors, said short arm extending generally upwards at an angle, one end of said first power cylinder pivotally connected to said wheeled frame and the other end of said first power cylinder pivotally connected to said L-shaped link intermediate said outer ends of said long and short arms, said long arm extending over said pivotal connection of first power cylinder to said frame, one end of said second power cylinder pivotally connected to said outer end of said long arm of said L-shaped link, the other end of said second power cylinder pivotally connected to said containment tub; and means for engaging said first and second power cylinders whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means.

2. The bidirectional side dump trailer of claim 1 wherein said containment tub further comprises at least one circumferential reinforcement band mounted on said tub, said band connected to said front wall, said rear wall and said side walls and extending around said containment tub such that said walls are reinforced by said circumferential reinforcement band.

3. The bidirectional side dump trailer of claim 1 wherein said containment tub further comprises a central tub reinforcement structure mounted within said containment tub, said central tub reinforcement structure having a generally inverted V-shaped cross-sectional shape including front and rear walls angled upwards and inwards and connecting to one another forming a top, said walls mounted on said base wall and said side walls, said top of said central tub reinforcement structure extending upwards to a point below the top of said containment tub whereby said containment tub may carry long objects such as trees and poles.

4. The bidirectional side dump trailer of claim 1 wherein said wheeled frame comprises two I-beam main frame support members extending generally parallel with each other in spaced-apart relation, said support members secured in spaced-apart relation by forward and rearward tub support beams each extending generally parallel with one another and generally perpendicular to said support members, said forward tub support beam adapted to support said first and second forward tub supports and said rearward tub support beam adapted to support said first and second rearward tub supports and thereby support said containment tub on said wheeled frame.

5. The bidirectional side dump trailer of claim 4 wherein said first and second forward and rearward pivotable support connectors each comprise a wedge mount plate on which is pivotally mounted a tub mount wedge bar, said tub mount wedge bar depending downwardly from said wedge mount plate and including an upper mount section and lower wedge section and a wedge stop plate mounted on said tub mount wedge bar above said lower wedge section.

6. The bidirectional side dump trailer of claim 5 wherein said first and second forward and rearward tub supports each comprise a generally upright wedge-receiving slot formed in a respective one of said forward and rearward tub support beams each having a top with a generally rectangular and horizontal wedge-receiving aperture and a plurality of slot walls depending downwardly and inwardly therefrom thereby forming said wedge-receiving slot, said wedge-receiving slot being of a size and shape to receive said lower wedge section of said tub mount wedge bar therein, said wedge-receiving aperture being of a size and shape such that upon said lower wedge section of said tub mount wedge bar being inserted into said wedge-receiving slot, said wedge stop plate is prevented from entering said wedge-receiving slot, said wedge stop plate thus engaging said support beam and supporting said containment tub thereon.

7. The bidirectional side dump trailer of claim 6 wherein said first and second forward and rearward releasable locking means each comprise an air-actuated pin securement system operatively associated with a respective one of said forward and rearward tub supports, said pin securement system including a slidably mounted generally cylindrical pin connected to a pin extending and retracting mechanism, said pin operative to extend through said walls of said wedge-receiving slot and through said lower wedge section of said tub mount wedge bar thereby securing said lower wedge section of said tub mount wedge bar within said wedge-receiving slot.

8. The bidirectional side dump trailer of claim 7 further comprising locking device control means operatively connected to each of said air-actuated pin securement systems for alternately extending and retracting said cylindrical pins for securing selected tub mount wedge bars within respective wedge-receiving slots, whereby said containment tub may be dumped to one side or the other of said wheeled frame by securing said first forward and rearward pivotable support connectors thereby dumping said containment tub about a pivot axis defined by said first forward and rearward pivotable support connectors, and securing said second forward and rearward pivotable support connectors whereby said containment tub will pivot about said second forward and rearward pivotable support connectors.

9. The bidirectional side dump trailer of claim 4 wherein said frame further comprises a lifting system well mounted on and between said I-beam main frame support members intermediate said forward and rearward tub support beams, said well including a rectangular base wall extending generally horizontally for mounting said lifting system thereon.

10. The bidirectional side dump trailer of claim 9 wherein said L-shaped cylinder connection link of said lifting system comprises two generally parallel spaced-apart plates both having generally identical L-shapes, said plates connected to one another by at least two cylinder connection rods extending between and connecting said plates generally perpendicular thereto, a first connection rod positioned at the connection of said short and long arms and a second cylinder connection rod positioned between the outer ends of said long arms of said spaced-apart plates.

11. The bidirectional side dump trailer of claim 10 wherein said first and second power cylinders each comprise a hydraulic cylinder having a rod end and a cylinder end, each of said rod ends and said cylinder ends including a cylindrical connection sleeve for pivotably mounting said first and second power cylinders.

12. The bidirectional side dump trailer of claim 10 wherein said cylindrical connection sleeve of said cylinder end of said first power cylinder is pivotably mounted on said base wall of said well, said rod end of said first power cylinder is pivotably mounted on said first connection rod, said cylindrical connection sleeve of said cylinder end of said second power cylinder is pivotably mounted on said second connection rod and said cylindrical connection sleeve of said rod end of said second power cylinder is pivotably connected to said base wall of said containment tub whereby said lifting system is operative to lift said containment tub by exerting lifting force from underneath said containment tub.

13. A bidirectional side dump trailer comprising:
   a frame having a forward end, a rearward end and opposite sides;
   first and second forward tub supports mounted on forward tub support beams of said frame adjacent said forward end of said frame, said first forward tub support adjacent one side of said frame and said second forward tub support adjacent the other side of said frame;
   first and second rearward tub supports mounted on rearward tub support beams of said frame adjacent said rearward end of said frame, said first rearward tub support adjacent one side of said frame and said second rearward tub support adjacent the other side of said frame;
   a containment tub including a base wall, at least two side walls, a front wall and a rear wall thereby defining an open-topped containment tub having exterior and interior surfaces;
   first and second forward pivotable support connectors mounted on said exterior surface of said containment tub adjacent said front wall;
   first and second rearward pivotable support connectors mounted on said exterior surface of said containment tub adjacent said rear wall;
   said first and second forward and rearward pivotable support connectors each further comprising a wedge mount plate on which is pivotally mounted a tub mount wedge bar, said tub mount wedge bar depending downwardly from said wedge mount plate and including an upper mount section and lower wedge section and a wedge stop plate mounted on said tub mount wedge bar above said lower wedge section;
   said first and second forward and rearward tub supports each further comprising a generally upright wedge-receiving slot formed in a respective one of said forward and rearward tub support beams each having a top with a generally rectangular and horizontal wedge-receiving aperture and a plurality of slot walls depending downwardly and inwardly therefrom thereby forming said wedge-receiving slot, said wedge-receiving slot being of a size and shape to receive said lower wedge section of said tub mount wedge bar therein, said wedge-receiving aperture being of a size and shape such that upon said lower wedge section of said tub mount wedge bar being inserted into said wedge-receiving slot, said wedge stop plate is prevented from entering said wedge-receiving slot, said wedge stop plate thus engaging said support beam and supporting said containment tub thereon;
   said containment tub being pivotally mounted on said frame by releasable connection of each of said first and second forward pivotable support connectors to a respective one of said first and second forward tub supports, and releasable connection of each of said first and second rearward pivotable support connectors to a respective one of said first and second rearward tub supports;
   first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;
   a lifting system mounted on said frame intermediate said forward and rearward ends, said lifting system operative to lift and pivot said containment tub away from said frame; and
   means for selectively engaging said lifting system whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means.

14. A bidirectional side dump unit comprising:
   a frame having a forward end, a rearward end and opposite sides;
   first and second forward tub supports mounted on said frame adjacent said forward end of said frame, said first forward tub support adjacent one side of said frame and said second forward tub support adjacent the other side of said frame;
   first and second rearward tub supports mounted on said frame adjacent said rearward end of said frame, said first rearward tub support adjacent one side of said frame and said second rearward tub support adjacent the other side of said frame;
   a containment tub including a base wall, at least two side walls, a front wall and a rear wall thereby defining an open-topped containment tub having exterior and interior surfaces;
   first and second forward pivotable support connectors mounted on said exterior surface of said containment tub adjacent said front wall;
   first and second rearward pivotable support connectors mounted on said exterior surface of said containment tub adjacent said rear wall;
   said containment tub being pivotably mounted on said frame by releasable connection of each of said first and second forward pivotable support connectors to a respective one of said first and second forward tub supports, and releasable connection of each of said first and second rearward pivotable support connectors to a respective one of said first and second rearward tub supports;
   first and second forward releasable locking means each mounted adjacent a respective one of said first and second forward tub supports and first and second rearward locking means each mounted adjacent a respective one of said first and second rearward tub supports for releasably securing said first and second forward and rearward pivotable support connectors to a respective one of said forward and rearward tub supports;

a lifting system mounted on said frame intermediate said forward and rearward ends, said lifting system operative to lift and pivot said containment tub away from said frame;

means for selectively engaging said lifting system whereby said containment tub will pivot about said first forward and rearward pivotable support connectors when said first forward and rearward pivotable support connectors are secured within said first forward and rearward tub supports by said first forward and rearward locking means, and said containment tub will pivot about said second forward and rearward pivotable support connectors when said second forward and rearward pivotable support connectors are secured within said second forward and rearward tub supports by said second forward and rearward locking means;

said containment tub further comprising at least one circumferential reinforcement band mounted on said tub, said band connected to said front wall, said rear wall and said side walls and extending around said containment tub such that said walls are reinforced by said circumferential reinforcement band; and said containment tub further comprising a central tub reinforcement structure mounted within said containment tub, said central tub reinforcement structure having a generally inverted V-shaped cross-sectional shape including front and rear walls angled upwards and inwards and connecting to one another forming a top, said walls mounted on said base wall and said side walls, said top of said central tub reinforcement structure extending upwards to a point below the top of said containment tub whereby said containment tub may carry long objects.

\* \* \* \* \*